United States Patent

Rose

Patent Number: 5,164,144
Date of Patent: Nov. 17, 1992

[54] PROCESS FOR MAKING CARD BODIES AND CARDS INCORPORATING GRAPHIC SYMBOLS

[75] Inventor: René Rose, Voisin-le-Bretonneux, France

[73] Assignee: Schlumberger Industries, Montrouge, France

[21] Appl. No.: 563,754

[22] Filed: Aug. 7, 1990

[30] Foreign Application Priority Data

Aug. 7, 1989 [FR] France ............... 89 10591

[51] Int. Cl.⁵ ............... B29C 33/18; B29C 45/07
[52] U.S. Cl. ............... 264/511; 264/160; 264/259; 264/271.1; 264/261
[58] Field of Search ............... 264/259, 132, 157, 160, 264/272.15, 511, 271.1, 261; 40/626

[56] References Cited

U.S. PATENT DOCUMENTS

| | | |
|---|---|---|
| 3,654,062 | 4/1972 | Loew. |
| 3,839,129 | 10/1974 | Newmann ............... 264/247 |
| 4,304,809 | 12/1981 | Moraw et al. ............... 40/626 |
| 4,420,174 | 12/1983 | Phelps et al. ............... 40/626 |
| 4,519,155 | 5/1985 | Gallagher et al. ............... 40/626 |
| 4,560,426 | 12/1985 | Moraw et al. ............... 40/626 |
| 4,625,102 | 11/1986 | Rebjock et al. ............... 235/492 |
| 4,737,620 | 4/1988 | Mollet et al. . |
| 4,879,161 | 11/1989 | Raymond et al. ............... 40/626 |
| 4,896,027 | 1/1990 | Drexler ............... 40/626 |

FOREIGN PATENT DOCUMENTS

| | | |
|---|---|---|
| 0254640 | 7/1987 | European Pat. Off. . |
| 267826 | 10/1987 | European Pat. Off. ............... 264/328.1 |
| 0344058 | 5/1989 | European Pat. Off. . |
| 0371855 | 11/1989 | European Pat. Off. . |
| 1234237 | 5/1960 | France . |
| 1340878 | 9/1963 | France . |
| 2605144 | 10/1986 | France . |
| 2010169 | 12/1977 | United Kingdom . |
| 2185708A | 7/1987 | United Kingdom . |

Primary Examiner—Jan H. Silbaugh
Assistant Examiner—Angela Ortiz
Attorney, Agent, or Firm—Lowe, Price, LeBlanc & Becker

[57] ABSTRACT

A process for making a card body provided with a graphic symbol. A label is placed in a mould and said label is maintained against the wall of the mould. A plastics material (ABS) is injected through the nozzle of the mould. Preferably, the label presents a graphic symbol on its two faces and the plastics material is transparent.

4 Claims, 4 Drawing Sheets

PROCESS FOR MAKING CARD BODIES AND CARDS INCORPORATING GRAPHIC SYMBOLS

FIELD OF THE INVENTION

The present invention relates to the production of card bodies, particularly those incorporating electronic memory, which comprise a graphic symbol on at least one of their principal faces, this graphic symbol consisting of alphanumeric information or designs for decorative or advertizing purposes.

BACKGROUND OF THE INVENTION

In order to produce the body of such cards, particularly electronic memory cards in accordance with ISO standards, a well known technique consists in making the body of the card by injection moulding, for example of ABS, in a mould whose imprint defines the shape of the body of the card (French Patent No. 2 605 144 describes such a process). Instead of making the body of the card directly by moulding, it is possible to mould a sheet of plastics material from which the bodies of a plurality of cards will subsequently be cut out. However, due to the specifications of dimensions (particularly concerning the thickness of the card body) and of physical properties (particularly concerning the bending properties of the card), it is virtually impossible to make a sheet corresponding to a large number of card bodies.

In both the case of an individual card body and of a sheet corresponding to four card bodies, the piece which is to be printed has relatively small dimensions. Moreover, in view of the fact that the card body has a thickness of the order of 0.8 mm, the bending properties of the piece to be printed are very different from those of the conventional printing supports. For these two reasons, it is delicate to print with the aid of conventional machines, whether offset or screen printing, especially if the graphic symbol is complex by reason in particular of the shades of colour of which it is composed. Moreover, the fact of making upon each passage one single "image" or a limited number of images, is costly and requires, each time, the precise positioning of the piece with respect to the printing machine. In addition, the adhesion of a pre-printed sheet on pieces of reduced dimensions is virtually impossible due to high costs.

It is an object of the present invention to overcome these drawbacks by providing a process for producing card bodies which enables graphic symbols of excellent quality to be produced under acceptable economic conditions, whilst being compatible with the use of an injection-moulding technique.

SUMMARY OF THE INVENTION

According to a first aspect of the invention, the process makes it possible to produce one single card body directly, and it is characterized by the following steps of:

a) furnishing a mould whose imprint defines the outer shape of the card body, said imprint being limited by two principal walls defining said principal faces;

b) disposing in said mould at least one support element comprising on at least one of its faces a graphic symbol and maintaining said support element against one of the principal walls of the mould so that the face or one of the faces of the support element comprising a graphic symbol is applied against said wall;

c) injecting a thermoplastics material into said mould so that said thermoplastics material fills all the space limited by said imprint not occupied by said support element and adheres to said support element; and d) demoulding the piece, whereby a card body provided with a graphic symbol is obtained.

According to a second aspect of the invention, the process makes it possible to produce a plurality of card bodies simultaneously, and it is characterized by the following steps of:

a) furnishing a mould whose imprint defines the outer shape to be given to a sheet, said imprint being limited by two principal walls, each principal wall containing one of the principal faces of the plurality of bodies to be made, said walls being separated by a distance equal to said thickness (e);

b) disposing in said mould at least one support element comprising on at least one of its faces the graphic symbols to be made on the plurality of card bodies and maintaining said support element against one of the principal walls of the mould so that the face or one of the faces of the support element comprising graphic symbols is applied against said principal wall;

c) injecting a thermoplastics material into said mould so that the thermoplastics material fills all the space limited by said imprint not occupied by said support element and adheres to said support element;

d) demoulding the sheet thus obtained; and e) cutting said sheet to separate said card bodies.

It will be readily understood that, thanks to the invention, the graphic symbol is made during the moulding step itself. The printing supports are cut out from preprinted sheets which comprise a very large number of identical patterns. The cost thereof is therefore reduced since perfectly conventional printing techniques are employed. In addition, the printing supports being positioned in the imprint of the mould, the graphic symbol is automatically "positioned" with respect to the body of the card.

The invention also relates to the application of said process for making card bodies to the manufacture of a complete card, i.e. a card comprising in addition an electronic module fixed on the card body.

BRIEF DESCRIPTION OF THE DRAWINGS

The invention will be more readily understood on reading the following description with reference to the accompanying drawings, in which:

FIG. 2b is a view in elevation, on a smaller scale, of the mobile part of the mould of FIG. 2a.

FIG. 3b is an enlarged partial view of FIG. 3a.

DETAILED DESCRIPTION OF THE PREFERRED EMBODIMENTS

Figure 1:
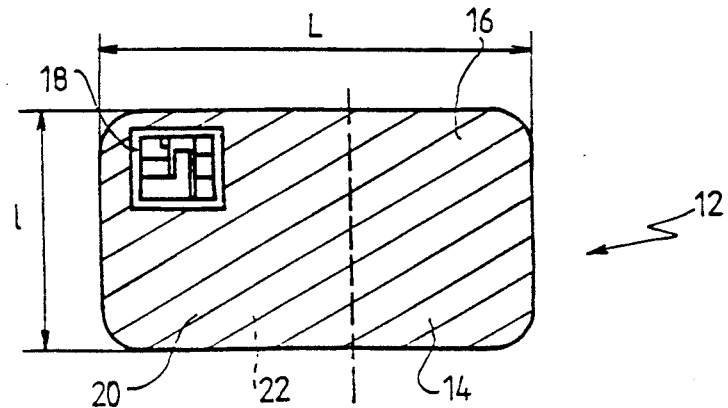
FIG. 1 is a plan view of a card incorporating an electronic memory.

Referring now to the drawings, FIG. 1 shows in plan view a card incorporating electronic memory, of known type. The card 12 comprises a card body 14 of rectangular parallelepipedic shape, of length L, width l and thickness e. In accordance with standard ISO 7810, L is equal to 85 mm, l to 55 mm and e to 0.8 mm. In addition, body 14 must satisfy a certain number of tests, particularly concerning its bending properties. It is made of a plastics material. In the front principal face 16 of the card body appear electrical contact zones 18. There are eight, for example. The shape and dimensions of these contacts, as well as their position with respect to the edges of the card body are also in accordance with standard ISO 7810. The front face 16 of the card body always includes a graphic symbol 20 represented by hatching in the Figure. The term graphic symbol is understood to mean either decorative or advertizing designs, alphanumeric legend, or a combination of the two. Generally, the rear face 22 of the card body also presents a graphic symbol. The card further comprises an electronic module (not shown in the Figure), in particular including an integrated circuit of which the terminals are connected to the contact zones 18.

The invention relates to a process for making a card body by injection-moulding of a thermoplastics material, which directly comprises a graphic symbol on at least one of its principal faces, typically the front face 16.

According to a first embodiment of the invention, an individual card body with its graphic symbol is moulded directly. According to a second embodiment, a sheet with a plurality of graphic symbols is moulded, then this sheet is cut out in order to obtain the card bodies.

Figure 2A:
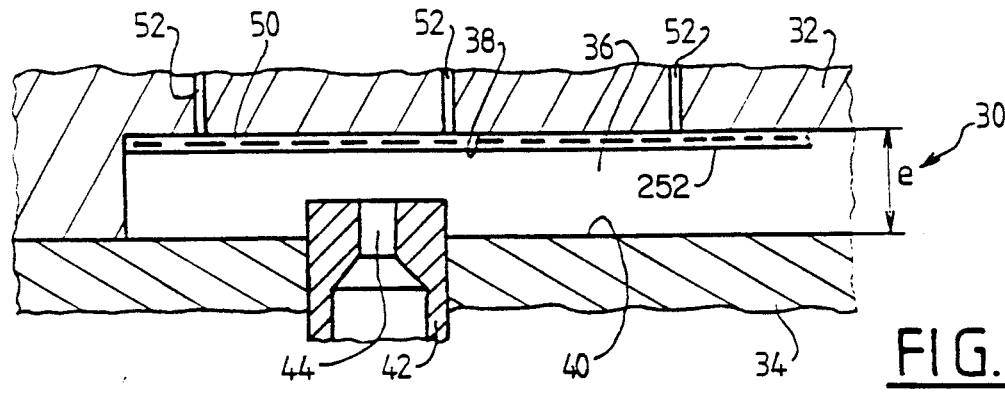
FIG. 2a is a partial section of a mould for a first embodiment of the invention.
Figure 2B:
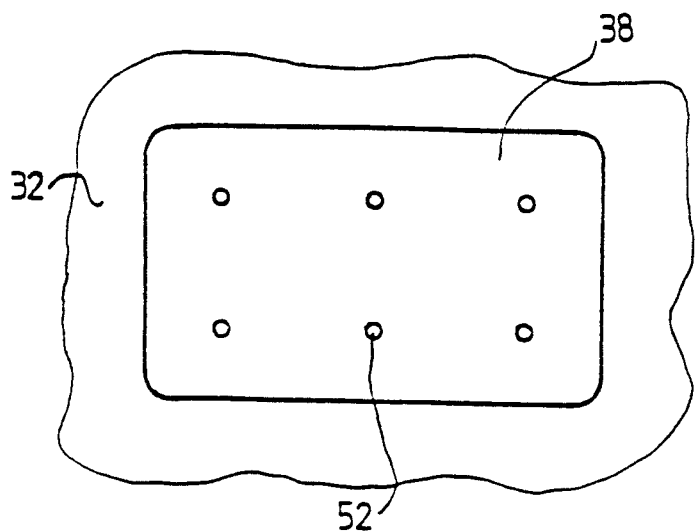

Referring now to FIGS. 2a and 2b, a first example of the first embodiment of the invention will be described. An injection mould 30 is used which comprises a fixed part 32 and a mobile part 34. When the mould 30 is closed, parts 32 and 34 define an imprint 36 which presents the shape which it is desired to give the card body. The principal wall 38 of part 32 defines a principal face of the card body, whilst the principal wall 40 of part 34 defines the other principal face. The distance between the two principal faces 38 and 40 is therefore equal to e and each principal wall has the shape of a rectangle whose dimensions are equal to l and L. The card body, in the case of an electronic memory card, must present a cavity to allow the electronic module to be positioned. To that end, part 34 of the mould comprises a core 42 which projects into imprint 36. The core presents, in negative, the shape which it is desired to give the cavity. The French Patent mentioned above gives the possible shapes of the core. The core 42 preferably has an injection nozzle 44 formed therein, allowing penetration of the moulding material inside the imprint 36.

In order to manufacture the card body, a graphic symbol support element or label is firstly made from a support band on which are made a very large number of identical graphic symbols. A label is separated from the rest of the band by being cut out. The support band may be made of an opaque material which lends itself well to silk-screen or offset printing. For example, a polyester film having a thickness of 50 to 80 microns may be used. Polystyrenes, regenerated or not, may also be used. In the embodiment described, the film comprises a different graphic symbol on each of its faces. After cut-out, each label therefore comprises a different graphic symbol on each of its faces. The label is cut out so as to have exactly the same dimensions as the principal faces of the card body.

The production of the card body will now be described. The mould 30 being open, the label 50 is positioned so that it is applied against the principal wall 38 of the mobile part 32 of the mould. In order to maintain the label 50 against the wall 38, part 32 of the mould comprises a certain number of orifices 52 of very small diameter (for example 0.2 mm) which open out in the principal wall 38. Orifices 52 are connected to a suction system. The mould is then closed and the moulding material is injected into the imprint 36 through nozzle 44. The thermoplastics material injected is transparent ABS in the example described at present; the conditions of injection are those described in the French Patent mentioned hereinabove. The moulding material fills the whole of the imprint and, taking into account its temperature and relative fluidity, it adheres to face 252 of the label 50. If the material constituting label 50 is not compatible with the moulding material, an adhesive varnish may be deposited on the graphic symbol of face 252 of the label.

Despite the very small thickness of the imprint (0.8 mm) compared with its transverse dimensions, the tests made have shown that the graphic symbols made on the label were not altered by the injection of the plastics material, and that the label did not modify the bending property of the card body.

Figure 2C:
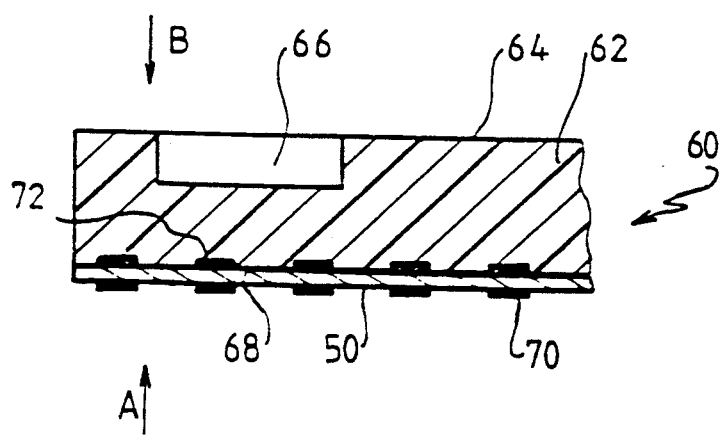
FIG. 2c is a view in vertical section of a card body obtained by the first embodiment of the invention.

FIG. 2c shows in transverse section the card body 60 obtained by the technique which has just been described. The card body 62 proper is transparent. In its principal face 64 opens out the cavity 66 serving to house the electronic module. On its second principal face 68 is fixed the label 50. If the card body is observed in the direction of arrow A, the graphic symbol 70 made on the outer face of the label 50 is seen directly. If the card body is observed in the direction of arrow B, the graphic symbol 72 made on the inner face of the label 50 is seen through the body 62 which is transparent. As the thickness of the card body is small (0.8 mm), the effect of parallax due to the transparent material is negligible and it is as though there was in fact a graphic symbol on each principal face of the card body. Furthermore, it appears that the vision of the graphic symbol through the transparent card body improves the aesthetic qualities of the card body. It goes without saying that the term ABS is understood to mean not only pure ABS but also various derivatives of ABS. In addition, the transparent ABS may be replaced by ASN.

Figure 3A:
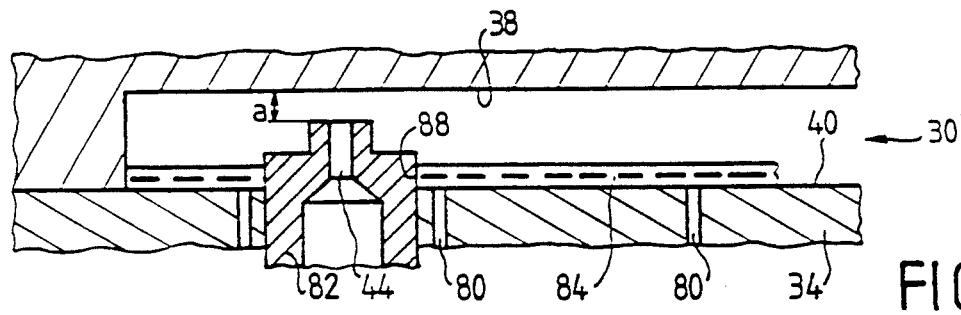
FIG. 3a is a view in vertical section of a mould for a first variant of the first embodiment of the invention.
Figure 3B:
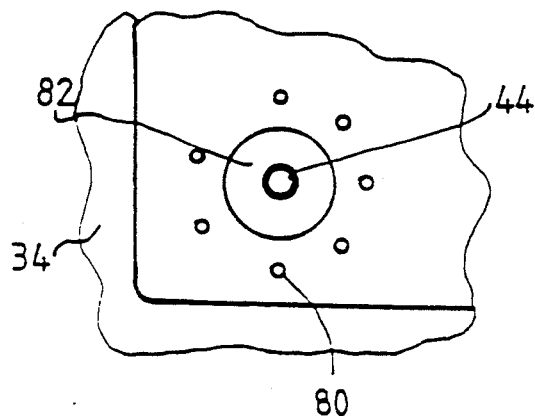

FIGS. 3a and 3b illustrate a second example of the first embodiment of the invention. It is particularly well adapted when the cavity to be made in the card body is deep compared with the thickness of the card body. Mould 30' is identical to mould 30 of FIG. 2a, except for two differences: the suction orifices 80 open out in the principal face 40 of the fixed part 34 of the mould. The core 82 which still comprises injection nozzle 44 has a different shape in order to make a deeper cavity. In other words, the end 82a of the core 82 is nearer the principal wall 38. As shown more clearly in FIG. 3b, suction holes 80 are disposed in a ring in the immediate vicinity of the core 82.

To implement this second example, a label 84 is used which is identical to label 50 of FIG. 2a, except for the presence of a window 88. Label 84 is positioned in the mould against the principal wall 40 so that the core 82 passes through window 88. To allow the label to be positioned, a clearance, for example 1/10 th of mm, must be left between the periphery of the core 82 and the edge of the window 88. The plastics material is injected into the imprint 36 as already described in connection with FIGS. 2a and 2b. The card body thus made is then demoulded. It is made, for example, of ABS.

It should be noted that the suction holes 80 disposed around the core 82 make it possible to apply well against wall 40 that part of the label which surrounds the window 88 and therefore to avoid this part of the label moving away from the wall 40 under the effect of the circulation of the moulding material during injection. Moreover, as the label 84 is placed against wall 40 and not against wall 38, the distance a between the end of the core and wall 38 remains sufficient to allow an injection under normal conditions.

Figure 3C:
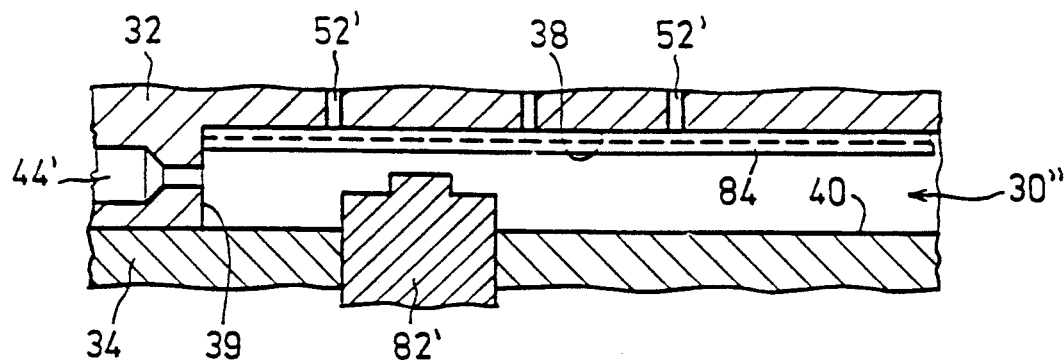
FIG. 3c is a view in vertical section of a second type of mould for the first embodiment of the invention.

FIG. 3c illustrates a fourth example of the first embodiment of the invention.

According to this fourth example, mould 30" differs from mould 30' essentially in that the core 82' serves only to define the cavity to be made in the card body and the injection nozzle 44' opens out in the lateral wall 39 of part 32 of the mould. In addition, as in the case of FIG. 2a, suction holes 52' open out in the principal wall 38 of part 32 of the mould to maintain the label 84 applied against this wall.

This solution is particularly advantageous when the cavity to be made with the aid of the core 82' is deep. In addition, as there is no point of injection in the core, the cavity in the card body has a perfectly defined shape. After the card body has been demoulded, the edge of the card must, of course, be locally re-machined at the spot corresponding to the point of injection. Moreover, it goes without saying that several points of injection opening in the lateral wall 39 of the mould may be provided.

Figure 4:
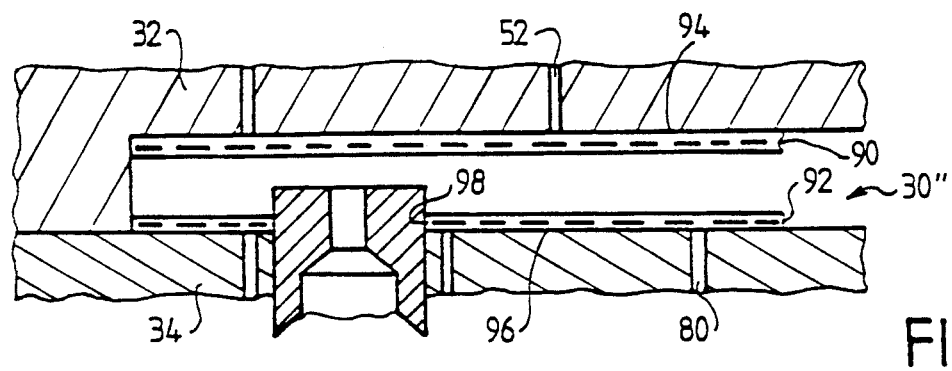
FIG. 4 is a view in vertical section of a mould for a second variant of the first embodiment of the invention.

FIG. 4 illustrates a third example of the first embodiment of the invention. In this example, the graphic symbols on the two principal faces of the card body are made with the aid of two labels 90 and 92. Label 90 bears one graphic symbol only on its face 94. Label 92 bears one graphic symbol only on its face 96 and it comprises a window 98. Mould 30" comprises a fixed part 32 identical to that of mould 30 of FIG. 2a and a mobile part 34 identical to that of mould 30' of FIG. 3a. Labels 90 and 92 are positioned in the mould as shown in FIG. 4. Mould 30' is closed and injection is effected. In this case, it is, of course, not necessary to use a transparent moulding material. The card body is then demoulded.

In the foregoing examples, the labels are cut out from a film of pre-printed polyester 50 to 80 microns thick. It goes without saying that other material may be used, for example paper of appropriate quality and of sufficiently reduced thickness in order not to take up too much room in the mould.

It has been indicated in the foregoing description that each card body was moulded individually. This should be understood to mean that, on leaving the mould, the card body already presents its outer shape. However, it is clear that the same injection machine may comprise a plurality of imprints connected together by an assembly of injection channels supplying the injection nozzles.

In the foregoing description, the label or labels are held against the principal wall of the mould with the aid of suction holes. The labels may also be maintained in place in the following manner: advantage is taken of the fact that the band on which the graphic symbols are made and therefore the labels which are cut out from this band, are generally electrically charged due to the nature of the material and the manipulations made on this band. If the mould is granted, when the electrically charged label is applied against the principal wall of the mould it is held there. To ensure that the label presents a sufficient electrical charge, it is preferable to pass the band serving to make the labels in a polarizing apparatus.

Figure 5:
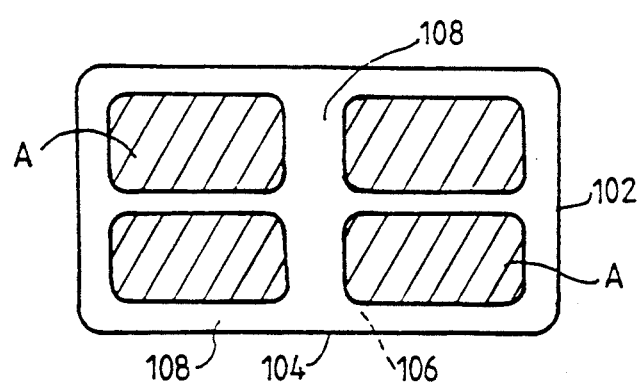
FIG. 5 is a view of a printing support for a second embodiment of the invention.

A first example of the second embodiment of the invention will now be described with reference to FIGS. 5 and 6. According to this embodiment, a sheet is made by injection-moulding, whose thickness is equal to e and of which the other dimensions are sufficient to make a plurality of card bodies, for example four. During moulding, cavities are made, each cavity corresponding to a card body, and a printing support element is positioned which corresponds to as many labels as it is desired to manufacture card bodies with the sheet.

After the sheet has been demoulded, it is cut out to individualize each card body. Card bodies are thereby obtained which are identical to those obtained with the first embodiment of the invention, the card bodies being able to be of one of the three types already described, namely: transparent body and label on the front face, transparent body and label on the rear face, and non-transparent body and label on each of the faces.

The technique of moulding the sheet with its graphic symbols is, in principle, very close to that used for making the individual card bodies. Just one example of the second embodiment of the invention will therefore be described with reference to FIGS. 5 and 6. FIG. 5 shows a support element 102 adapted to be used for the second embodiment of the invention. It is constituted by a portion of a non-transparent film identical to that described in connection with FIGS. 2 to 4. On each of the faces 104 and 106 of the support element 102 have been printed four identical graphic symbols A intended for making four card bodies simultaneously. Each graphic symbol A has the dimensions L and l of a principal face of a card body. Each graphic symbol A is surrounded by a non-printed zone 108.

Figure 6A:
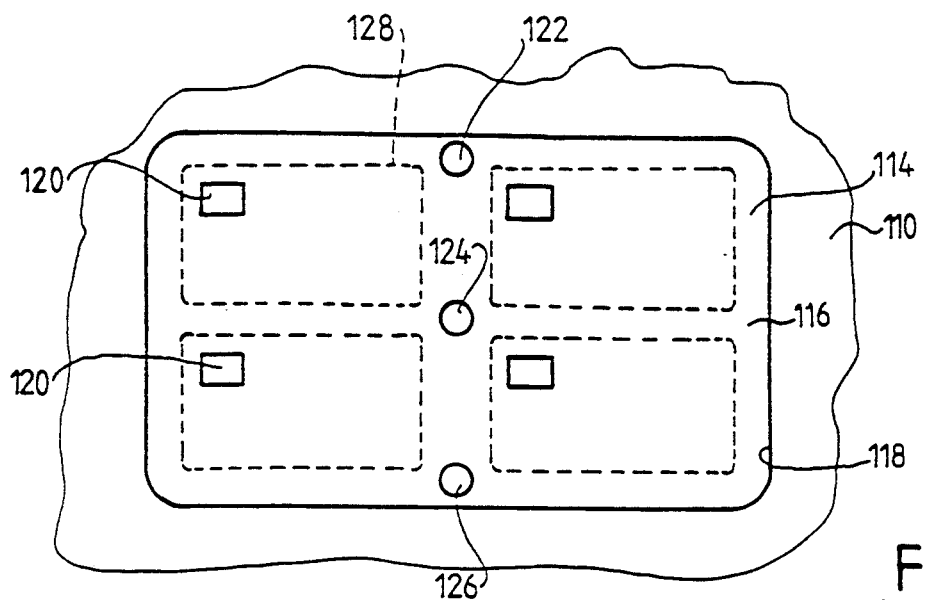
FIG. 6a is a view in elevation of the fixed part of a mould for the second embodiment of the invention.
Figure 6B:
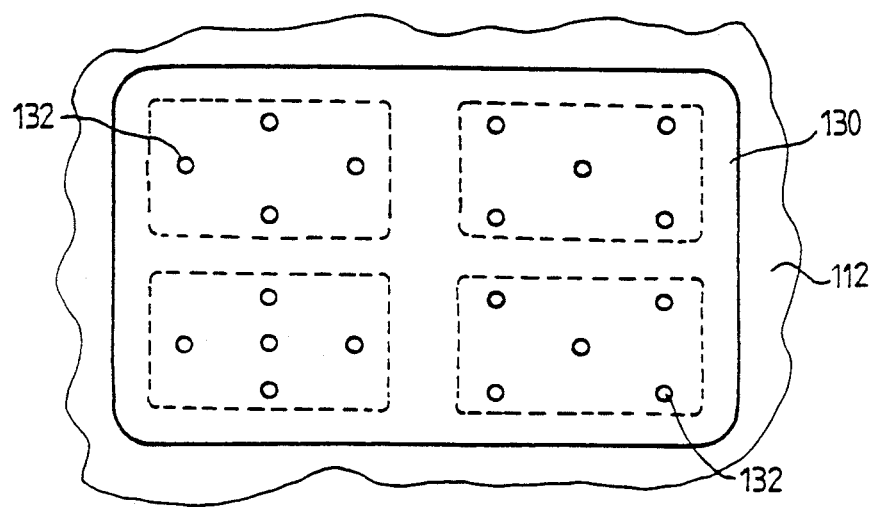
FIG. 6b is a view in elevation of the mobile part of the mould for the second embodiment of the invention.

FIGS. 6a and 6b show the form of a mould adapted to be used for the second embodiment of the invention, FIG. 6a showing the fixed part 110 of the mould and FIG. 6b its mobile part 112.

The fixed part comprises an imprint 114 which defines a principal wall 116 and a lateral wall 118. In the principal wall 116 there project four cores 120 adapted to make the cavities of the four card bodies. Injection nozzles 122 to 126 open out in the wall 116. The contour of the card bodies to be made has been shown in broken lines 128. The injection nozzles 122 to 126 open out in the wall 116 outside the zones 128 corresponding to the card bodies. In a variant embodiment, if the height of the cores 120 is not too great, it is advantageous if the injection nozzles open out in the cores 120 as described in detail in connection with FIGS. 2 to 4.

The mobile part 112 of the mould defines the second principal wall 30 of the mould. In the wall 128 open out suction orifices 132. These orifices 132 have the same dimensions as orifices 52 of FIG. 2a and they are more particularly concentrated in zones 128 corresponding to the different card bodies. When the mould is closed, the distance between the two principal walls 116 and 130 is equal to e, i.e. to the thickness of the card body.

Production of the card bodies will now be described. The mould being open, the support element 102 is positioned against the wall 130 of the mobile part of the mould, and the suction system is switched on. The mould is then closed and the plastics material, which is for example transparent ABS, is injected. When the plastics material has solidified, the mould is opened. A sheet of thickness e is then obtained, comprising four cavities and presenting graphic symbols on one of its faces.

In the following step, the sheet thus obtained is cut out in order to make four card bodies which are identical to the one shown in FIG. 2c. In addition to the graphic symbols proper, the support element presents positioning marks in order to allow precise cut-out of the card body. In this second embodiment, it is also possible to hold the label against the principal wall of the card body by creating or using the electrostatic charges as described in detail in connection with the first embodiment of the invention.

It should be added that, in certain cases, only the graphic symbol on the front face of the card body is complex to make. It may in that case be advantageous to use the embodiment of FIGS. 3 with a non-transparent injection material and a label bearing a graphic symbol only on its outer face.

In the foregoing detailed description, only the production of the card body with its graphic symbols has been considered. Now, as is well known, a complete card comprises not only a card body, but also an electronic module mounted in the cavity in the card body. The electronic module essentially comprises a semiconducting chip in which are made electronic circuits, outer electrical contact zones visible at 18 in FIG. 1, electrical connections between the contact zones and the terminals of the semiconducting chip and, most often, a coating material for protecting the semiconducting chip and the electrical connections. The electronic modules for memory cards may present different forms and configurations. In particular, the outer electrical contact zones as well as the electrical connections may be made in different ways. U.S. Pat. Nos. 4,625,102 and 4,737,620 describe several embodiments of these modules. Published European Patent Applications Nos. 254 640, 371 855 and 344 058 filed in the name of SCHLUMBERGER INDUSTRIES, describe other forms of electronic modules. The description of these Patents and Patent Applications must be considered as forming an integral part of the present specification.

Figure 7:
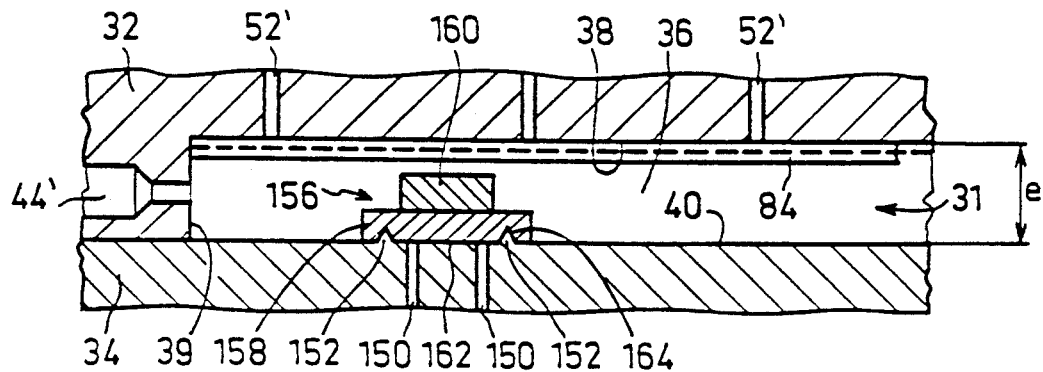
FIG. 7 is a view in vertical section of a mould showing a first embodiment of a complete memory card.
Figure 8:
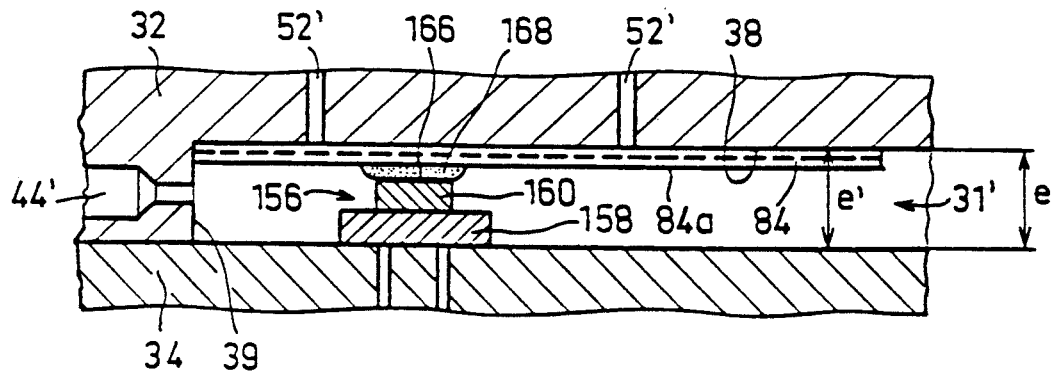
FIG. 8 is a view in vertical section of a mould showing a second embodiment of a complete card.

Referring successively to FIGS. 7 and 8, two embodiments of complete memory cards, i.e. comprising an electronic module, will be described.

In the example illustrated in FIG. 7, a mould 31 is used which is identical to mould 30'' of FIG. 3c, except for the following difference: core 82 is eliminated and replaced by suction orifices such as 150.

In addition, the portion of wall 40 of part 34 of the mould where core 82' projected is provided with small positioning lugs 152.

The production of a card with the aid of the mould of FIG. 7 will now be described. When mould 31 is open, a manipulator positions a label 84 against the wall 38 of the mould. Suction is actuated in order to maintain the label 84 in place. Then, a manipulator positions an electronic module 156 against a part of the wall 40 of the mould. In FIG. 7, the electronic module 156 has been shown in simplified manner and with no respect for scale. Part 158 of the module has been shown which comprises the outer contact zones and part 160 which comprises the semiconducting chip, the electrical connections and the coating. The outer face 162 of part 158 of the electronic module is provided with small orifices 164 which may cooperate with the lugs 152 made in wall 40 of the mould. When the electronic module 156 is being positioned in the mould, the lugs 152 penetrate in the orifices 164 of the module. The latter is therefore perfectly positioned with respect to the wall of the mould and therefore with respect to the body of the card which will be produced. Suction is then actuated via orifices 150 to maintain the outer face 162 of the module applied against the wall 40 of the mould. The mould 31 is closed and the plastics material, which is transparent if the label 84 is double-faced, is injected through nozzle 44'. When the piece thus produced is demoulded, a complete card is obtained, the electronic module being overmoulded by the material forming the card body, except for its outer face 162.

FIG. 8 shows a second embodiment of a complete card. The mould 31' used is identical to mould 31 of FIG. 7. However, as shown in FIG. 8, it does not necessarily present the positioning lugs 152 of FIG. 7.

According to this second embodiment, there is introduced into the open mould an assembly constituted by the label 84 and a module 156 which is already fixed on label 84. More precisely, the inner face 166 of part 160 of the electronic module is fixed on the inner face 84a of label 84 by a layer 168 of adhesive material. The thickness of the layer 168 of adhesive material is determined so that the total thickness e of the assembly formed by label 84, module 156 and layer of adhesive 168, is very slightly greater than the thickness e of the cavity of the mould. Due to its prior fixation on label 84, the electronic module 156 is perfectly positioned with respect thereto.

When the mould is open, a manipulator introduces therein the assembly constituted by label 84 and module 156, and label 84 is placed against wall 38 of the mould. The suction system associated with orifices 52 is actuated, and the mould 31 is closed. During this closure, the outer face 162 of the electronic module 156 is applied against wall 38 of part 34 of the mould. The difference between the thicknesses e and e' is absorbed by a corresponding crushing of the layer of adhesive material 168. The plastics material is then injected into the cavity of the mould via injection nozzle 44'.

Upon demoulding, a complete card is obtained, identical to the one obtained by the process of FIG. 7. It goes without saying that the adhesive material 168 and the plastics moulding material must be totally compatible and, if possible, both transparent or both in the same shade.

Of course, the process which has just been described with reference to FIGS. 7 and 8 may be applied to the simultaneous manufacture of a plurality of cards with the aid of a mould whose print makes a sheet corresponding to a plurality of card bodies. The modifications to be made to FIGS. 5 and 6 are those described in connection with FIGS. 3c, 7 and 8.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A process for producing a plurality of card bodies, each card body presenting two principal faces separated by a predetermined thickness, wherein at least one of said principal faces comprises a graphic symbol, the process comprising the steps of:

furnishing a mould having a unique imprint which defines the outer shape to be given to a sheet, said imprint being limited by two substantially parallel walls, each principal wall containing one of the principal faces of the plurality of bodies to be made, said walls being separated by a distance equal to said predetermined thickness;

disposing in said mould at least one support element comprising on at least one of its faces the graphic symbols to be made on the plurality of card bodies and maintaining said support element against one of the principal walls of the mould so that one of the faces of the support element comprising graphic symbols is applied against said one principal wall;

injecting a thermoplastics material into said mould so that the thermoplastics material fills all the space limited by said imprint not occupied by said support element and adheres to said support element;

demoulding the sheet thus obtained; and cutting said sheet to separate said card bodies, wherein each of said card bodies comprises a cavity, wherein one of the principal walls of the imprint of the mould comprises a number of cores equal to the number of card bodies to be made, and an injection orifice is disposed in one of the cores.

2. The process of claim 1, comprising the further step of:

applying suction through said coreless wall to hold said support element thereagainst prior to said injection step.

3. A process for producing a plurality of card bodies, each card body presenting two principal faces separated by a predetermined thickness, wherein at least one of said principal faces comprises a graphic symbol, the process comprising the steps of:

furnishing a mould having a unique imprint which defines the outer shape to be given to a sheet, said imprint being limited by two substantially parallel walls, each principal wall containing one of the principal faces of the plurality of bodies to be made, said walls being separated by a distance equal to said predetermined thickness;

disposing in said mould at least one support element comprising on at least one of its faces the respective graphic symbols to be made on the plurality of card bodies and maintaining said support element against one of the principal walls of the mould so that one of the faces of the support element comprising said graphic symbols is applied against one principal wall of the mould;

injecting a thermoplastics material into said mould so that the thermoplastics material fills all the space limited by said imprint not occupied by said support element and adheres to said support element;

demoulding the sheet thus obtained and cutting said sheet to separate said card bodies, wherein said thermoplastics material is transparent and said support element is formed as a single element and comprises graphic symbols on each of its two faces, the number of graphic symbols each being equal to the number of card bodies, said plastics material is injected through at least one orifice disposed in a lateral wall of the imprint of the mould, and wherein during said disposing step, one support element is disposed against a first principal wall of the mould and an inner face of an electronic module is temporarily affixed at a selected position at the second principal wall of the mould so that an outer face of the electronic module is applied against said second principal face of the mould.

4. A process for producing a plurality of card bodies, each card body presenting two principal faces separated by a predetermined thickness, wherein at least one of said principal faces comprises a graphic symbol, the process comprising the steps of:

furnishing a mould having a unique imprint which defines the outer shape to be given to a sheet, said imprint being limited by two substantially parallel walls, each principal wall containing one of the principal faces of the plurality of bodies to be made, said walls being separated by a distance equal to said predetermined thickness;

disposing in said mould at least one support element comprising on at least one of its faces the graphic symbols to be made on the plurality of card bodies and maintaining said support element against one of the principal walls of the mould so that one of the faces of the support element comprising graphic symbols is applied against said one principal wall;

injecting a thermoplastics material into said mould so that the thermoplastics material fills all the space limited by said imprint not occupied by said support element and adheres to said support element;

demoulding the sheet thus obtained; and cutting said sheet to separate said card bodies, wherein said thermoplastics material is transparent and said support element is formed as a single element and comprises graphic symbols on each of its two faces, the number of graphic symbols each being equal to the number of card bodies, said plastics material is injected through at least one orifice disposed in a lateral wall of the imprint of the mould, said disposing step comprises disposing in said mould an assembly comprising a support element and an electronic module, said electronic module being rendered fast with said support element by a layer of adhesive material to connect an inner face of said electronic module to that face of said support element not applied against a principal wall of the mould, the thickness of said assembly being at least equal to the magnitude of said predetermined thickness, and said layer of adhesive material is crushed during closure of the mould.

* * * * *